Aug. 28, 1951 W. P. SCHMITTER 2,566,253
TRANSMISSION
Filed Oct. 31, 1949 3 Sheets-Sheet 1

INVENTOR.
Walter P. Schmitter
BY
Quarles & French
Attorneys

Aug. 28, 1951 W. P. SCHMITTER 2,566,253
TRANSMISSION
Filed Oct. 31, 1949 3 Sheets-Sheet 2

INVENTOR.
Walter P. Schmitter
BY
Quarles & French
Attorneys

Aug. 28, 1951     W. P. SCHMITTER     2,566,253
TRANSMISSION
Filed Oct. 31, 1949     3 Sheets-Sheet 3
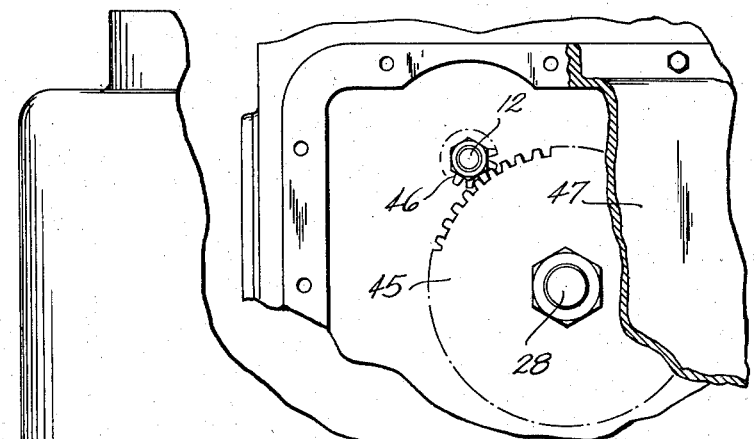
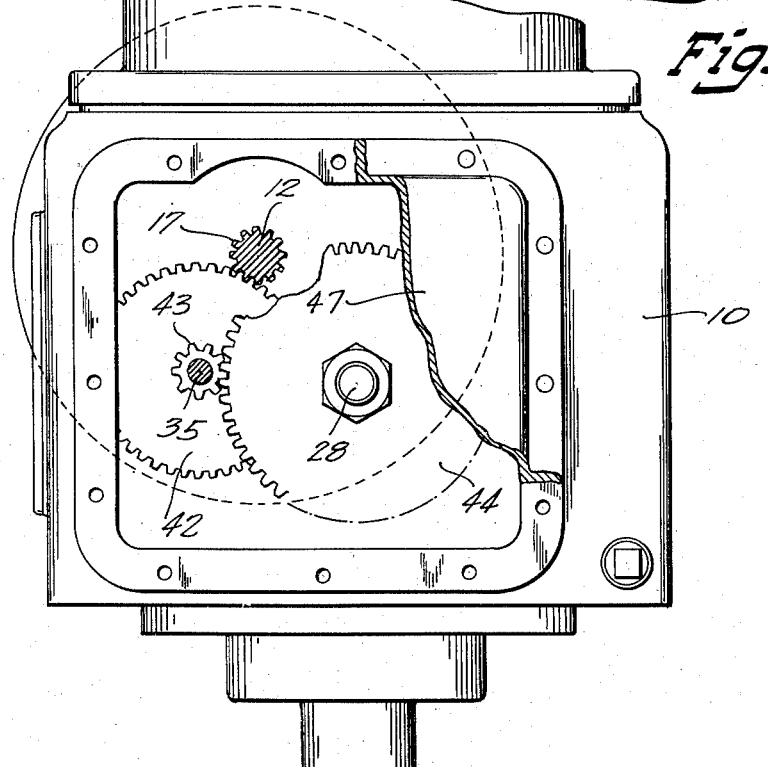
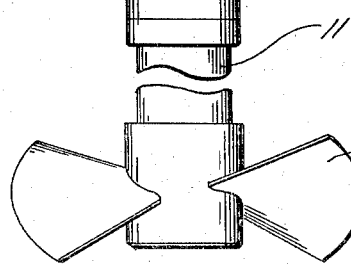
INVENTOR.
Walter P. Schmitter
BY
Quarles & French
Attorneys Patented Aug. 28, 1951

2,566,253

UNITED STATES PATENT OFFICE 2,566,253

TRANSMISSION

Walter P. Schmitter, Wauwatosa, Wis., assignor to The Falk Corporation, Milwaukee, Wis., a corporation of Wisconsin Application October 31, 1949, Serial No. 124,624

2 Claims. (Cl. 74—420)

The invention relates to geared transmission mechanism.

The main object of the invention is to provide a geared transmission mechanism for driving agitators, mixers, and the like at a predetermined speed and one in which the parts are so arranged that either a double reduction or a triple reduction may be had by the selection of suitable change gears, so that except for the change gears the same unit may be used.

The invention further consists in the several features hereinafter set forth and more particularly defined by claims at the conclusion hereof.

In the drawings:

Fig. 5 is an elevation view of the transmission mechanism, parts being broken away and parts being shown in section and showing the triple reduction arrangement;

Fig. 6 is a detailed elevation view of the transmission, parts being broken away and parts being shown in section and showing the double reduction arrangement.

Figure 1:
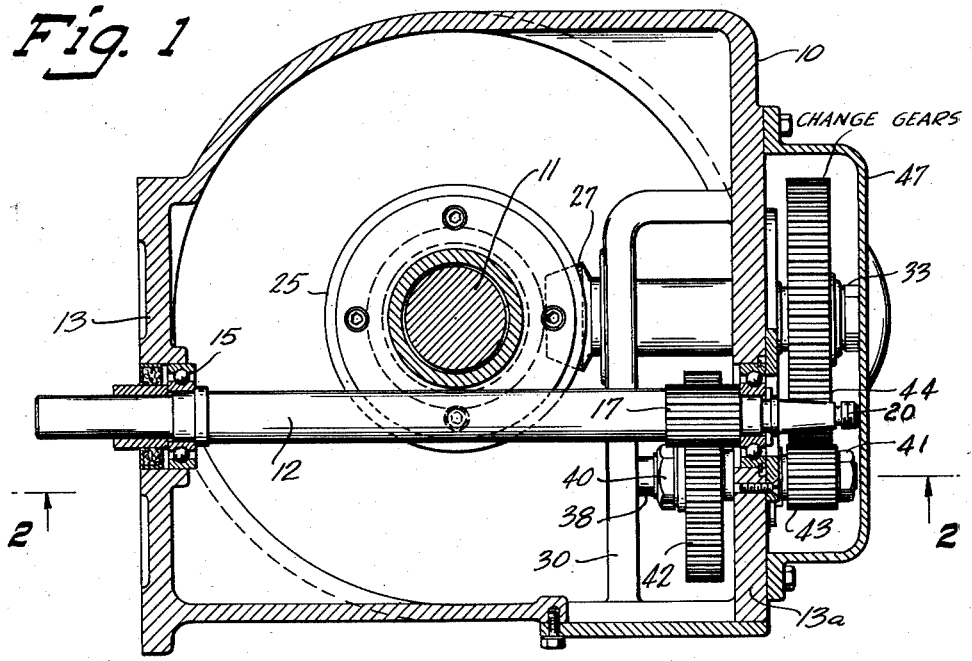
Fig. 1 is a horizontal sectional view through transmission mechanism embodying the invention taken on the line 1—1 of Fig. 2 showing the triple reduction arrangement.
Figure 4:
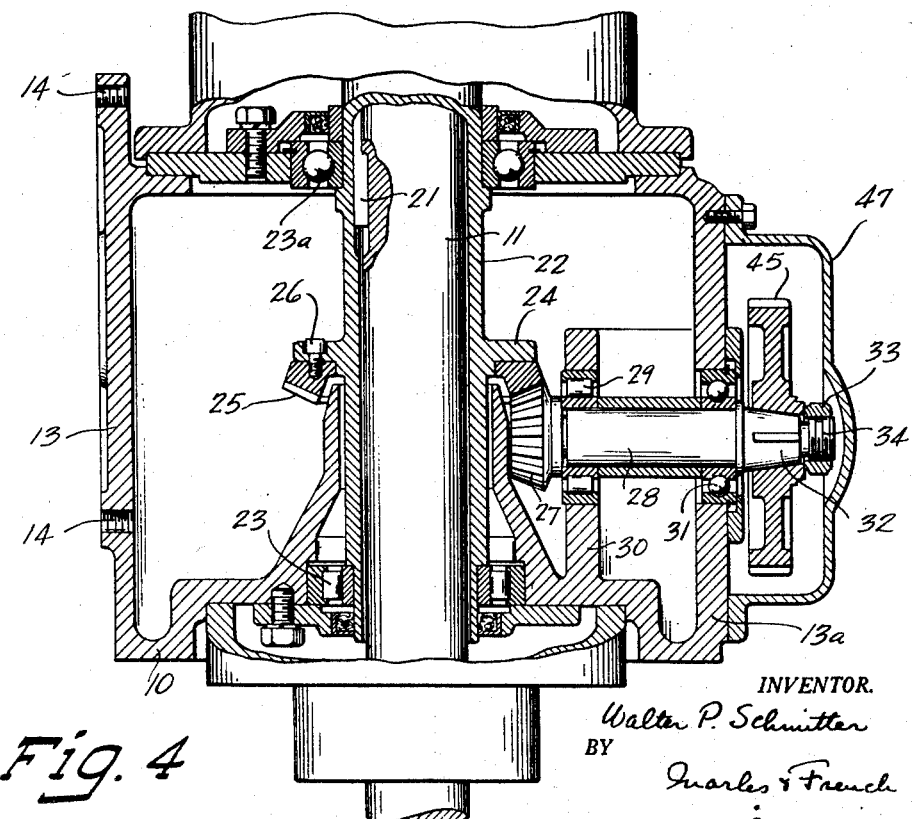
Fig. 4 is a vertical sectional view taken on the line 4—4 of Fig. 3.

Referring to Figs. 1, 4, and 5, the numeral 10 designates a housing having a driven shaft 11 journalled therein and a drive shaft 12 also journalled therein and extended at right angles to the shaft 11 and adjacent one side thereof.

The housing 10 has a motor pad or base portion 13 formed on one side thereof on which an electric drive motor (not shown) may be mounted and secured by fastening means passing through the threaded holes 14 in said base portion and have its shaft coupled to the extended end of the drive shaft 12.

The drive shaft 12 is journalled in a ball bearing 15 mounted in the side 13 and a ball bearing 16 mounted in the opposite side 13a of the housing and has a pinion 17 formed integral therewith or secured thereto and a tapered outer end portion 18 for keyed attachment of a gear thereto secured by a nut 19 on the threaded end 20 of said shaft.

The driven shaft 11 is keyed at 21 to a sleeve shaft 22 which is journalled in a roller bearing 23 at the bottom and a ball bearing 23a at the top, respectively, of the main part of the housing 10. The sleeve shaft 22 has a flange 24 intermediate its ends to which a bevel gear 25 is secured by machine screws 26, said gear meshing with a bevel gear 27 mounted on a countershaft 28 which is parallel to the shaft 12 and whose axis is in the same plane as the axis of the shaft 11 but is disposed at right angles thereto. The shaft 28 at its front end is mounted in a roller bearing 29 in a partition 30 of the housing and at its rear end is mounted in ball bearings 31 in a side 13a of the housing, and it has a tapered outer end portion 32 for keyed attachment of a gear thereto secured by a nut 33 on the threaded end 34 of said shaft.

An auxiliary or secondary countershaft 35 is mounted in bearings 36 and 37 in the partition 30 and the side 13a of the housing 10, and it has tapered gear receiving portions 38 and 39 with clamping nuts 40 and 41 on threaded portions of said shaft. The shaft 35 is parallel to the shafts 12 and 28 and is disposed below the shaft 12 and to one side of the shaft 28.

With the above arrangement of shafting either a double or triple gear reduction may be had from the shaft 11 to the shaft 12.

Figure 2:
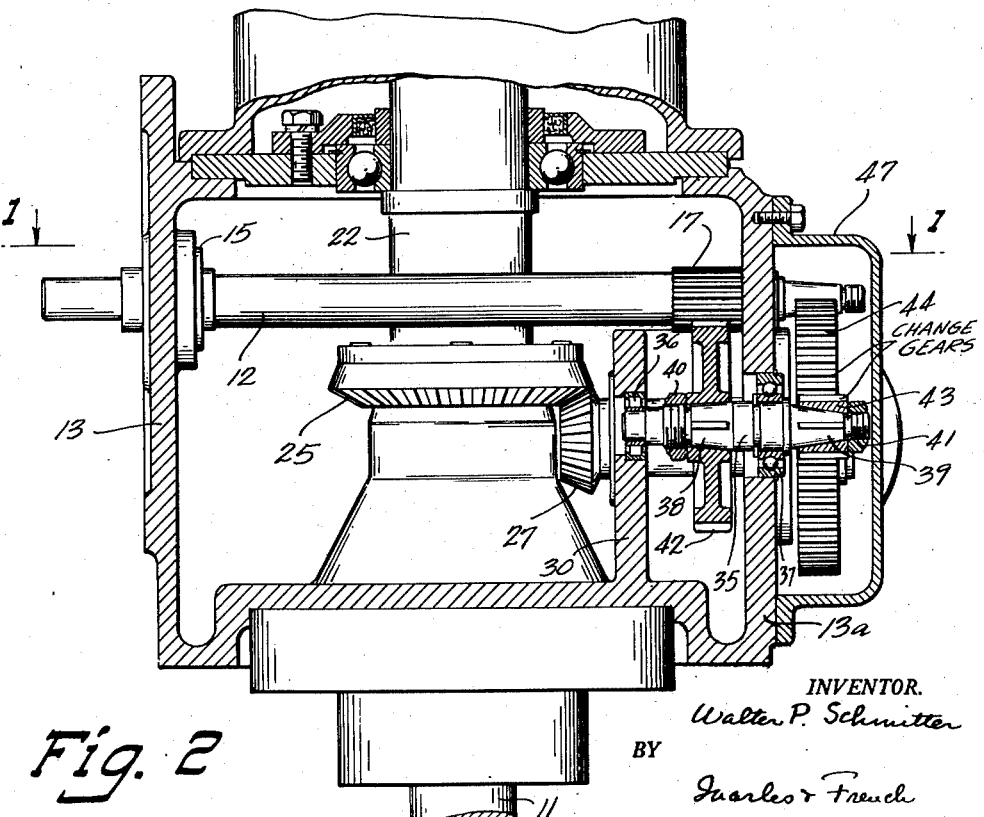
Fig. 2 is a vertical sectional view taken on the line 2—2 of Fig. 1.

Referring to Figs. 1, 2, and 5, for the triple reduction the shaft 35 has a gear 42 mounted on the tapered portion 38 and meshing with the pinion 17, and it has a pinion 43 mounted on the tapered portion 39 and meshing with a gear 44 on the tapered end 32 of the shaft 28. The gears 42 and 44 may be one set of sets of change gears so that by using various sets of change gears different speeds may be obtained between the shafts 35 and 28. This gearing gives a double reduction to the shaft 28 whose geared connection through the bevel gears 25 and 27 provides the third reduction.

Figure 3:
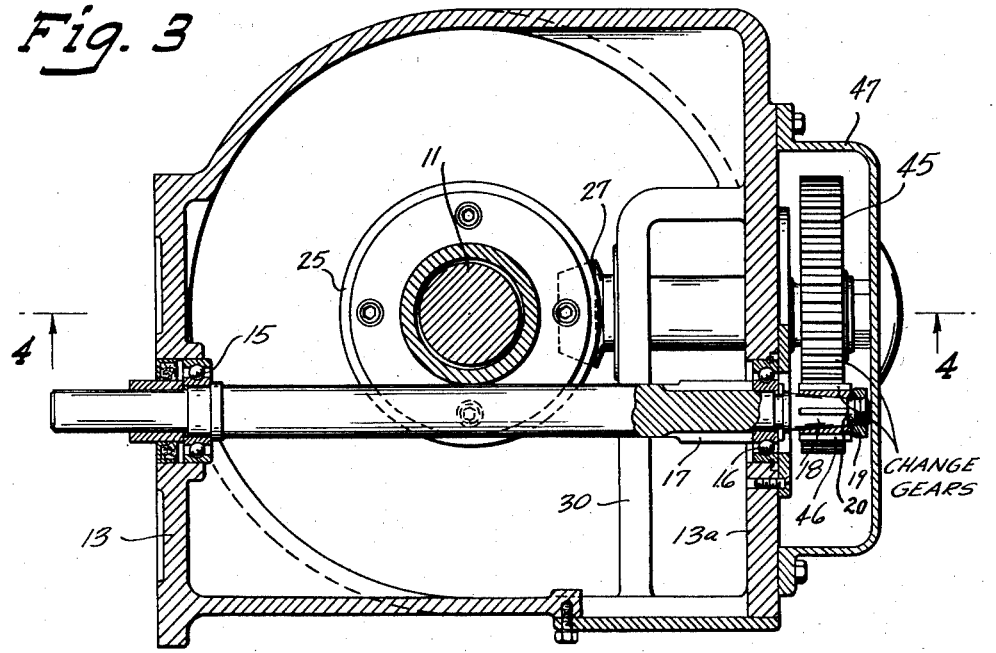
Fig. 3 is a view similar to Fig. 1 showing the double reduction arrangement.

Referring to Figs. 3 and 6, for the double reduction a gear or pinion 46 is mounted on the tapered portion 18 of the shaft 12 and meshes with a gear 45 on the tapered end 32 of the shaft 28. The gears 45 and 46 may be one set of sets of change gears that may be used between these two shafts, so that by using various sets of change gears different speeds may be obtained between the shafts 11 and 12. This gearing provides the first reduction, and the gears 25 and 27 provide the second reduction. It is to be noted that under these conditions there are no gears on the shaft 35.

The change gears 42 and 44 or 45 and 46 are disposed within a cover cap 47 detachably secured to the housing by cap screw 48.

The shaft 12 may be used to drive various devices such as an agitator 49.

It is to be noted that the sleeve shaft 22 may be considered a driven shaft.

It is to be understood that the invention is not to be limited to the details of construction above described except in so far as such limitations are included in the claims.

What I claim as my invention is:

1. In a power transmission for the purposes indicated, the combination of a housing, a driving shaft journalled at opposite end portions in said housing, a driven shaft journalled in said housing at substantially right angles to said driving shaft and disposed intermediate the ends of said driving shaft and offset laterally therefrom, a countershaft journalled in said housing substantially parallel to and laterally offset from one end portion of said driving shaft and having a bevel gear reduction connection with said driven shaft, and reduction gearing at one side of said housing between the driving shaft and said countershaft including gears exterior of said housing, said drive shaft extending from the other side of said housing for connection with a power source.

2. In a power transmission for the purposes indicated, the combination of a housing, a driven shaft journalled therein, a countershaft journalled in said housing at right angles to said driven shaft and geared thereto, driving means extending through said housing, said driving means including a torque transmitting shaft journalled in said housing substantially parallel to said countershaft, and means including gears carried by said torque transmitting shaft and said countershaft, respectively, and forming a driving connection therebetween, said gears being disposed externally of said housing at one side thereof and readily replaceable to vary the speed ratio between said last mentioned shafts, said driving means also including means at the other side of said housing for connection with a power source.

WALTER P. SCHMITTER.

REFERENCES CITED

The following references are of record in the file of this patent:

UNITED STATES PATENTS

| Number | Name | Date |
|---|---|---|
| 278,853 | Beche | June 5, 1883 |
| 280,757 | Myers | July 3, 1883 |
| 1,349,958 | Head | Aug. 17, 1920 |
| 1,728,279 | Ramsey | Sept. 17, 1929 |
| 2,022,436 | Schauer | Nov. 26, 1935 |
| 2,068,840 | Bennett et al. | Jan. 26, 1937 |
| 2,309,199 | McCormick | Jan. 26, 1943 |

FOREIGN PATENTS

| Number | Country | Date |
|---|---|---|
| 12,426 | Great Britain | Aug. 30, 1916 |